United States Patent [19]

Mitome

[11] E Patent Number: Re. 33,771

[45] Reissued Date of Patent: Dec. 17, 1991

[54] VISUALIZING METHOD FOR THREE DIMENSIONAL STANDING WAVE SOUND FIELD

[75] Inventor: Hideto Mitome, Tsukuba, Japan

[73] Assignees: Agency of Industrial Science and Technology; Ministry of International Trade and Industry, both of Tokyo, Japan

[21] Appl. No.: 494,391

[22] Filed: Mar. 16, 1990

Related U.S. Patent Documents

Reissue of:

[64] Patent No.: 4,878,210
Issued: Oct. 31, 1989
Appl. No.: 258,763
Filed: Oct. 17, 1988

[30] Foreign Application Priority Data

Nov. 19, 1987 [JP] Japan ..... 62-292640

[51] Int. Cl.[5] ..... H04B 1/02

[52] U.S. Cl. ..... 367/137; 367/191; 181/0.5

[58] Field of Search ..... 367/137, 191; 181/0.5; 73/505; 209/163

[56] References Cited

U.S. PATENT DOCUMENTS

| | | | |
|---|---|---|---|
| 3,878,617 | 4/1975 | West et al. | 33/369 |
| 4,055,491 | 10/1977 | Dorath-Furedi | 209/5 |
| 4,523,682 | 6/1985 | Barmatz et al. | 181/0.5 |
| 4,759,775 | 7/1988 | Peterson et al. | 55/277 |
| 4,773,266 | 9/1988 | Barmatz et al. | 73/505 |

*Primary Examiner*—Daniel T. Pihulic
*Attorney, Agent, or Firm*—Oblon, Spivak, McClelland, Maier & Neustadt

[57] ABSTRACT

A visualizing method for three dimensional standing wave sound field comprises the steps of mixing into a liquid medium a large number of fine particles of the same density as said liquid medium and exposing the liquid medium containing the fine particles to a three dimensional standing wave sound field produced by ultrasonic waves thus causing the fine particles to move to positions where the amplitude of the sound pressure is minimum, the sound pressure distribution of the three dimensional standing wave sound field being visualized by the distribution of the fine particles.

8 Claims, 2 Drawing Sheets

(30.35 KHz)

(31.19 KHz)

(31.79 KHz)

VISUALIZING METHOD FOR THREE DIMENSIONAL STANDING WAVE SOUND FIELD

Matter enclosed in heavy brackets [ ] appears in the original patent but forms no part of this reissue specification; matter printed in italics indicates the additions made by reissue.

*This is a reissue application of Ser. No. 258,763, filed Oct. 17, 1988, now U.S. Pat. No. 4,878,210, patented Oct. 31, 1989.*

BACKGROUND OF THE INVENTION

1. Field of the Invention

This invention relates to a visualizing method for three dimensional standing wave sound field.

2. Prior Art Statement

A standing wave sound field can be used for example in connection with technology for contactless retention of a specimen in outer space as when the development of new materials is conducted in a space station. Further, valuable information usable for quality control of newly developed materials can be obtained by examining the behavior exhibited by voids (bubbles) in a molten specimen within a standing wave sound field. It is also important to have information about standing wave sound fields in cases where, for example, an attempt is made to improve the cleaning uniformity of an ultrasonic cleaner.

For advancing these technologies, it is necessary to understand the sound pressure distribution of three dimensional standing wave sound fields. Conventionally, however, while it has been easy to determine the sound pressure distribution of a one dimensional sound field, it has not been easy to determine the same for a three dimensional standing wave sound field because of the highly complex numerical computations and the like that have had to be made for this purpose.

The computations required in respect of a one dimensional sound field are relatively simple. Moreover, there is available the well-known method according to Kundt's experiment in which a horizontal glass tube of a diameter sufficiently smaller than the wavelength of the sound concerned is charged with powder and the plane sound field is visualized by the movement of the powder. However, this method cannot be applied to the visualization of a three dimensional standing wave sound field.

OBJECT AND SUMMARY OF THE INVENTION

The object of the invention is to provide a visualizing method for three dimensional standing wave sound field comprising the steps of mixing into a liquid medium a large number of fine particles of the same density as said liquid medium and exposing the liquid medium containing the fine particles to a three dimensional standing wave sound field produced by ultrasonic waves thus causing the fine particles to move to positions where the amplitude of the sound pressure is minimum, the sound pressure distribution of the three dimensional standing wave sound field being visualized by the distribution of the fine particles.

As the [mehtod] *method* of this invention enables the sound pressure distribution to be visualized with ease, it can be used in connection with the design of ultrasonic cleaners and prediction of the behavior of voids in molten materials.

The above and other objects and [feaures] *features* of the invention will become more apparent from the following detailed description with reference to the accompanying drawings.

DETAILED DESCRIPTION OF THE PREFERRED EMBODIMENT

An explanation will first be made regarding the operating principle of the present invention.

In general, when small spheres of a volume V are exposed to ultrasonic waves in a medium, then insofar as the size of the small spheres is sufficiently smaller than the wavelength of the [ultasonic] *ultrasonic* waves, the force F acting on the small spheres as a result of the radiation pressure of the ultrasonic waves can be expressed by equation (1) (W. L. Nyborg, Ultrasound: its applications in medicine and biology, edited by F. J. Fry, published by Elsevier Scientific Publishing Co., 1978)

$$F = VY\nabla K_\epsilon - V(1-\gamma)\nabla P_\epsilon \quad (1)$$

$K_\epsilon$: time averaged kinetic energy $P_\epsilon$: time averaged potential energy $\nabla$: space-gradient operator $\gamma$: ratio of the compressibilities of the spheres and the medium Y: function of densities of sphere $\rho_s$ and that of medium $\rho_o$ $$Y = \frac{3 \cdot (\rho_S - \rho_0)}{2\rho_S + \rho_0} \quad (2)$$

Here, if the densities of the small spheres and the medium are equal ($\rho_s = \rho_o$), then $Y = 0$ and the first term on the right side of equation (1) becomes 0.

Since it is generally true that $\gamma < 1$ in the case of solid spheres in a liquid medium, $$F\alpha - \nabla P$$

which is to say that a force opposite to the potential energy gradient acts on the spheres. This means that within the sound field the force acts in the direction of minimum sound pressure amplitude.

Therefore, if a large quantity of fine particles of the same density as the medium are mixed with the medium within a given three dimensional standing wave sound field, the fine particles will in the end settle at the positions where the amplitude of the sound pressure is minimum. The [pressure districution] *pressure distribution* within the sound field can thus be observed by observing the distribution of the fine particles. This enables direct and immediate observation of, for example, changes in the state of resonance caused by varying the frequency of the ultrasonic waves forming the standing wave sound field or the position or shape of the reflecting surface, since any change in the state of resonance will cause a major difference in the distribution of the fine particles. It thus also becomes possible to use the method of this invention for investigating causes of change in resonance state.

Figure 1:
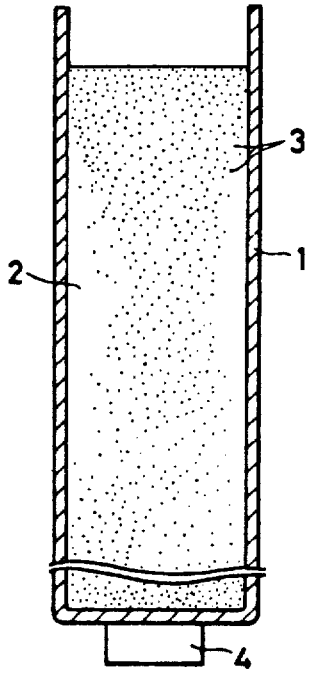
FIG. 1 is a schematic view of one example of an apparatus for carrying out the method of visualizing a standing wave sound field according to this invention.

FIG. 1 shows an example of an apparatus for carrying out the method of visualizing a standing wave sound field according to this invention. The apparatus consists of a transparent [cyclindrical] *cylindrical* container 1 containing a liquid medium 2 having a large number of fine [paticles] *particles* 3 suspended therein. At the bottom of the transparent cylindrical container 1 is disposed an ultrasonic wave transmitter 4 for sending ultrasonic waves into the liquid medium 2.

The [contianer] *container* 1 is designed to enable formation of a standing wave sound field by transmission of ultrasonic waves thereinto and should preferably be transparent at least at the side so as to make it possible to observe the state of the formed standing wave sound field.

As the liquid medium 2 to be held in the cylindrical container 1 there can be used any medium normally used in such apparatuses at the time of forming a standing wave sound field. As examples of the medium there can be mentioned brine, silicone oil and alcohols. As the fine particles to be mixed into the liquid medium there can be used any type insofar as they are sufficiently smaller in diameter than a wavelength satisfying equation (1), are of a particle diameter of 0.1–1 mm so as to be visible, have a specific gravity near that of the liquid medium, and are not changed in their properties by the medium.

For making the specific gravities of the medium 2 and the particles 3 the same, the fine particles can be coated with a paint or the like or, alternatively, an additive can be mixed into the liquid medium within such extent as does not substantially affect the state of resonance. For example, where water is used as the liquid medium 2, excellent results can be obtained when beads of polystyrene, polyethylene, nylon or the like are [uesd] *used* as the fine particles 3.

The amount of fine particles to be mixed into the liquid medium should be determined such that the state of distribution of the fine particles will be easy to observe and such that the presence of the fine particles will not disturb the sound field. Ordinarily, the amount of the particles is not more than 1% by volume with respect to the liquid medium.

The ultrasonic wave transmitter 4 is attached to the bottom of the container 1 and a standing wave is formed by the ultrasonic waves transmitted from the ultrasonic wave transmitter 4 and the [relfected] *reflected* waves from the water surface.

In the aforesaid arrangement, a prescribed amount of the fine particles 3 and liquid medium are, after having been adjusted to the same density, charged into the container 1 for observation of sound wave pressure distribution. Insofar as the ultrasonic wave output is large so that the radiation force according to equation (1) is large in comparison with any difference which arises between the force of gravity and the buoyancy acting on the fine [paticles] *particles* as a result of a difference in specific gravity between the fine particles and the liquid medium, it is not necessary for the adjustment of the specific gravity to be carried out with rigid precision.

Figure 2:
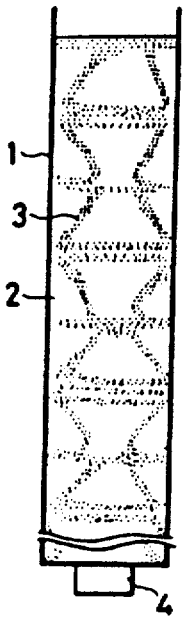
FIG. 2 is a diagram showing an example of the distribution of fine particles at the time of exposure to ultrasonic waves of a frequency of 30.35 kHz in accordance with the method of this invention.

Next the ultrasonic wave transmitter is caused to send into the container 1 ultrasonic waves of a wavelength capable of forming a standing wave, whereby there is formed a standing wave between the transmitter and the surface of the liquid. At this time, since the fine particles 3 move to the positions where the amplitude of the sound pressure is minimum, the pressure field is visualized within the cylindrical container 1.

Where the frequency of the ultrasonic waves produced by the ultrasonic wave transmitter 4 is 30.35 kHz, the distribution of the fine particles in the liquid medium becomes as shown in FIG. 2. If the frequency of the ultrasonic waves is changed to 31.19 kHz and then to 31.79 kHz, the distribution of the fine particles changes accordingly, to those shown in FIGS. 3 and 4, respectively. Thus the interior of the container does not assume a plane wave state but exhibits a complex sound pressure distribution. The fine particle distributions shown in these figure are immediate and direct visualizations of the change in resonance state which occurs with variation in frequency.

Use of the visualization method according to the present invention makes it possible to visualize the sound pressure distribution of three dimensional standing wave sound fields with the utmost ease, without need for complex numerical computation. As a result, it facilitates the work of designing ultrasonic cleaners and the prediction of the behavior of voids in molten materials.

Moreover, when the shape of the container 1 and the wavelength of the ultrasonic waves transmitted by the ultrasonic wave transmitter 4 are properly selected so that regions of low sound pressure are formed at predetermined locations within the container, the fine particles will collect at these regions. If fine tubes are inserted into these regions, it will become possible to extract the fine particles under suction. This invention thus also provides a simple and easy method for separating from a liquid medium solid substances contained therein which have a specific gravity close to that of the liquid medium, which has not been possible with conventional centrifugation.

There will now be explained an example of the invention. It should be understood, however, that the invention is in no way limited by this example.

EXAMPLE

Water to serve as a liquid medium was poured to a depth of 50 cm into a cylindrical container made from transparent acrylic resin and measuring 60 cm in length and 10 cm in inner diameter. As the fine particles there were used polystyrene beads with a diameter of about 0.5 mm and these were added to the liquid medium in an amount equivalent to about 1 volume % of the liquid medium. The specific gravity of the polystyrene beads was 1.05 and since the beads tend to sink within the liquid medium (specific gravity: 1.00) because of the slight difference in specific gravity, salt (NaCl) was added to the liquid medium as required to adjust its specific gravity to that of the polystyrene beads. The polystyrene beads were then caused to be suspended therein.

The cylindrical container had attached to the bottom thereof an ultrasonic wave transmitter capable of transmitting ultrasonic waves of a wavelength equal to about one-half the diameter of the cylinder (i.e. waves of a frequency of about 30 hKz), and ultrasonic waves of a [freqency] *frequency* of 30.35 kHz were transmitted into the liquid medium at a power amplifier output of 25 Vpp. As a result, as shown in FIG. 2, the polystyrene beads assumed a state resembling a series of alternately inverted coffee cups, the positions occupied by the polystyrene beads being the positions of minimum sound pressure.

For confirmation, the sound pressure distribution was measured using a small sensor, whereby it was found that the regions where the polystyrene beads had collected corresponded to the regions of minimum sound [presure] *pressure.*

Figure 3:
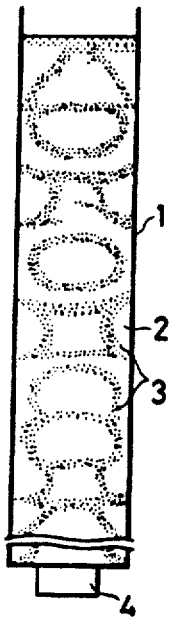
FIG. 3 is a diagram showing an example of the distribution of fine particles at the time of exposure to ultrasonic waves of a [frequenccy] *frequency* of 31.19 kHz.
Figure 4:
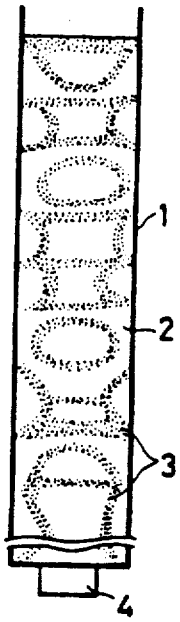
FIG. 4 is a diagram showing an example of the distribution of fine particles at the time of exposure to ultrasonic waves of a frequency of 31.79 kHz.

Thereafter, when the ultrasonic wave frequency was set to 31.19 kHz, the polystyrene beads assumed the partially spherical distribution pattern shown in FIG. 3, and when it was set to 31.79 kHz, they assumed the pattern shown in FIG. 4. Change in the sound pressure distribution of the standing wave with change in the frequency thereof could thus be visually and three-dimensionally confirmed.

I claim:

1. A visualizing method for three dimensional standing wave sound field comprising:

charging into a container equipped with an ultrasonic wave transmitter a medium consisting essentially of a liquid and a plurality of fine particles of the same density as said liquid, and causing said ultrasonic wave transmitter to transmit into said container ultrasonic waves of a frequency capable of forming a standing wave, whereby said fine particles [ar] *are* caused to move to positions where the amplitude of the sound pressure is minimum and the sound pressure distribution of the three dimensional standing wave sound field is visualized by the distribution of the fine particles.

2. A method according to claim 1 wherein said container is a [tansparent] *transparent* cylindrical container having a transparent side wall.

3. A method according to claim 1 wherein the amount of said fine particles charged into said container is not more than 1 volume % with respect to the amount of said liquid medium.

4. A method according to claim 2 wherein said transparent cylindrical container is formed of acrylic resin.

5. A method according to claim 1 wherein the diameter of said fine particles is between 0.1 and 1.0 mm.

6. A method according to claim 1 wherein said liquid medium is brine.

7. A method according to claim 1 wherein said fine particles are polystyrene beads.

8. A method for separating from a liquid medium fine particles of the same specific gravity as said liquid medium comprising:

charging into a container equipped with an ultrasonic wave transmitter a medium consisting essentially of a liquid and containing a large number of particles of the same density as said liquid, and causing said ultrasonic wave transmitter to transmit into said container ultrasonic waves of a frequency capable of forming a standing wave, thereby causing [said] *a* large number of *said* fine particles to collect at the positions where the amplitude of the sound pressure is minimum, and sucking said fine particles out from the regions at which they collect within the container through fine tubes inserted into said container.

* * * * *